US008205889B2

(12) United States Patent
Verma et al.

(10) Patent No.: US 8,205,889 B2
(45) Date of Patent: Jun. 26, 2012

(54) METHODS AND APPARATUS TO FACILITATE SEALING IN ROTARY MACHINES

(75) Inventors: Nikhil Kumar Verma, Bangalore Karnataka (IN); Jason Paul Mortzheim, Gloversville, NY (US); Yogesh Sathe, Bangalore Karnataka (IN); Hrishikesh Vishvas Deo, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 1246 days.

(21) Appl. No.: 11/945,555

(22) Filed: Nov. 27, 2007

(65) Prior Publication Data
US 2009/0136339 A1    May 28, 2009

(51) Int. Cl.
*F16J 15/447* (2006.01)
(52) U.S. Cl. ........................................ 277/303; 277/355
(58) Field of Classification Search .................. 277/303, 277/355, 411, 412; 415/173.2, 173.3, 174.1, 415/174.2, 230, 231
See application file for complete search history.

(56) References Cited

U.S. PATENT DOCUMENTS

| 6,343,792 | B1 | 2/2002 | Shinohara et al. |
| 6,571,470 | B1 | 6/2003 | Mortzheim et al. |
| 6,669,203 | B1 | 12/2003 | Mortzheim |
| 6,976,680 | B2 | 12/2005 | Uehara et al. |
| 7,066,468 | B2 | 6/2006 | Uehara et al. |
| 2002/0105146 | A1* | 8/2002 | Uehara et al. .................. 277/355 |
| 2004/0256810 | A1 | 12/2004 | Nakano et al. |
| 2006/0208427 | A1 | 9/2006 | Wright et al. |
| 2006/0210392 | A1 | 9/2006 | Enderby |
| 2007/0053772 | A1 | 3/2007 | Couture, Jr. et al. |
| 2007/0257445 | A1 | 11/2007 | Mortzheim et al. |
| 2009/0322028 | A1* | 12/2009 | Wright et al. .................. 277/301 |

* cited by examiner

*Primary Examiner* — Gilbert Lee
(74) *Attorney, Agent, or Firm* — Armstrong Teasdale LLP

(57) ABSTRACT

A method for assembling a rotary machine is provided. The method includes providing at least one seal assembly that includes at least one annular seal housing defined by a top wall, a front wall, and a rear wall, that are connected together such that a cavity is defined within the housing, coupling a plurality of flexible plates within the cavity such that the plates are axially-spaced from the front wall and the rear wall within the cavity, coupling at least one side plate to the at least one annular seal housing such that the at least one side plate is moveable with respect the front wall and the rear wall, and coupling the at least one sealing assembly within a rotary machine to facilitate sealing between a rotary component and a stator component.

20 Claims, 4 Drawing Sheets

1

METHODS AND APPARATUS TO FACILITATE SEALING IN ROTARY MACHINES

BACKGROUND OF THE INVENTION

This application relates generally to rotary machines and more particularly, to methods and apparatus for sealing rotary machines.

At least some known rotary machines such as, but not limited to steam turbines or gas turbines, include a plurality of seal assemblies in a fluid flow path to facilitate increasing the operating efficiency of the rotary machine. For example, some known seal assemblies are coupled between a stationary component and a rotary component to provide sealing between a high-pressure area and a low-pressure area. Moreover, to facilitate thrust balancing, a turbine rotor may be sealed relative to a cooperating stator to facilitate maintaining a higher pressure in a forward portion of the rotor as compared to a lower pressure in an aft portion of the rotor.

At least some known seal assemblies include seal members such as, but not limited to, brush seals, labyrinth seals, and/or compliant plate seals. Compliant plate seals generally include a plurality of compliant plates such as, but not limited to, leaf seals, shingles seals, tapered plate seals, laby-plate seals, and/or intermediate plate seals, that are oriented in a pack extending circumferentially about a central rotational axis of a rotary component. More specifically, the plates are oriented such that a tip of each plate contacts the rotor or rotary component during various operating conditions of the rotary machine. For example, during shut down of the turbine engine, a portion of the plates are generally in contact with a rotary component. During rotation of the rotary component, various forces such as compliant plate/rotor contact forces, hydrodynamic lifting forces, and differential pressure forces cause the plates to deflect upward. Compliant plate/rotor contact forces are generated as a result of contact between the compliant plate and the rotary component. Hydrodynamic lifting forces are generated by rotation of the rotary component. Differential pressure forces include radially outward lifting forces and radially inward blow-down forces that are generated due to the static pressure distribution on the compliant plates. A balance between preventing contact between the compliant plate tips and the rotor, and preventing seal leakage is desirable to increase the life-span of the compliant plates and to increase the efficiency of the rotary machine.

Some known seal assemblies include a seal housing that includes a high-pressure-side front wall and a low-pressure-side rear wall that is spaced a distance from the front wall such that a cavity is defined therebetween. In such seal assemblies, the gap between the compliant plates and the front wall, and the gap between the compliant plates and the rear wall, are each defined based on the positional mounting of the compliant plates within the cavity. Known seal assemblies are generally assembled in an attempt to ensure known gap widths are defined between the seal housing and the compliant plates.

Generally, variations in sizes of the physical gaps may influence the magnitude of forces exerted on the compliant plates and as such may adversely impact the ability of the plates to prevent axial flow leakage through the seal assemblies. In some known seal assemblies, the size and/or configuration of the front and rear gaps enable lifting forces or blow-down forces to impact the compliant plates. The size and/or configuration of the physical gaps, in some known seal assemblies, are fixed and as a result, such designs limit the control of the forces exerted on the compliant plates. For example, depending on the forces exerted during operation, the compliant plate tips may contact the rotor during shut down of the rotary machine, which may undesirably reduce the life-span of the compliant plates and/or the efficiency of the rotary machine.

BRIEF DESCRIPTION OF THE INVENTION

In one aspect, a method for assembling a rotary machine is provided. The method includes providing at least one seal assembly that includes at least one annular seal housing defined by a top wall, a front wall, and a rear wall, that are connected together such that a cavity is defined within the housing, coupling a plurality of flexible plates within the cavity such that the plates are axially-spaced from the front wall and the rear wall within the cavity, coupling at least one side plate to the at least one annular seal housing such that the at least one side plate is moveable with respect the front wall and the rear wall, and coupling the at least one sealing assembly within a rotary machine to facilitate sealing between a rotary component and a stator component.

In another aspect, a seal assembly for a rotary machine is provided. The seal assembly includes an annular seal housing comprising a top wall, a front wall coupled to the top wall, and a rear wall coupled to the top wall such that the rear wall is spaced from the front wall such that a cavity is defined within the housing, a plurality of circumferentially-spaced flexible compliant plates coupled within the cavity, and at least one side plate slidably coupled to at least one of the front wall and the rear wall to facilitate controlling a flow of fluid through at least one of the front wall and the rear wall.

In a further aspect, a rotary machine is provided. The rotary machine includes a rotary component including an axis of rotation, a stationary component coupled adjacent to the rotary component, and a seal assembly coupled between the stationary component and the rotary component, the seal assembly comprising an annular seal housing comprising a top wall, a front wall coupled to the top wall, and a rear wall coupled to the top wall, such that a cavity is defined within the housing, a plurality of circumferentially-spaced compliant plates coupled within the cavity, and at least one side plate slidably coupled to at least one of the front wall and the rear wall to facilitate controlling a flow of fluid within the cavity.

DETAILED DESCRIPTION OF THE INVENTION

It should be appreciated that the terms "axial" and "axially" are used throughout this application to refer to directions and orientations extending substantially parallel to an axis of rotation of a rotary machine. It should also be appreciated that the terms "radial" and "radially" are used throughout this application to refer to directions and orientations extending substantially perpendicular to the axis of rotation of the rotary machine. It should also be appreciated that the terms "circumferential" and "circumferentially" are used throughout this application to refer to directions that circumscribe the axis of rotation of the rotary machine.

Figure 1:
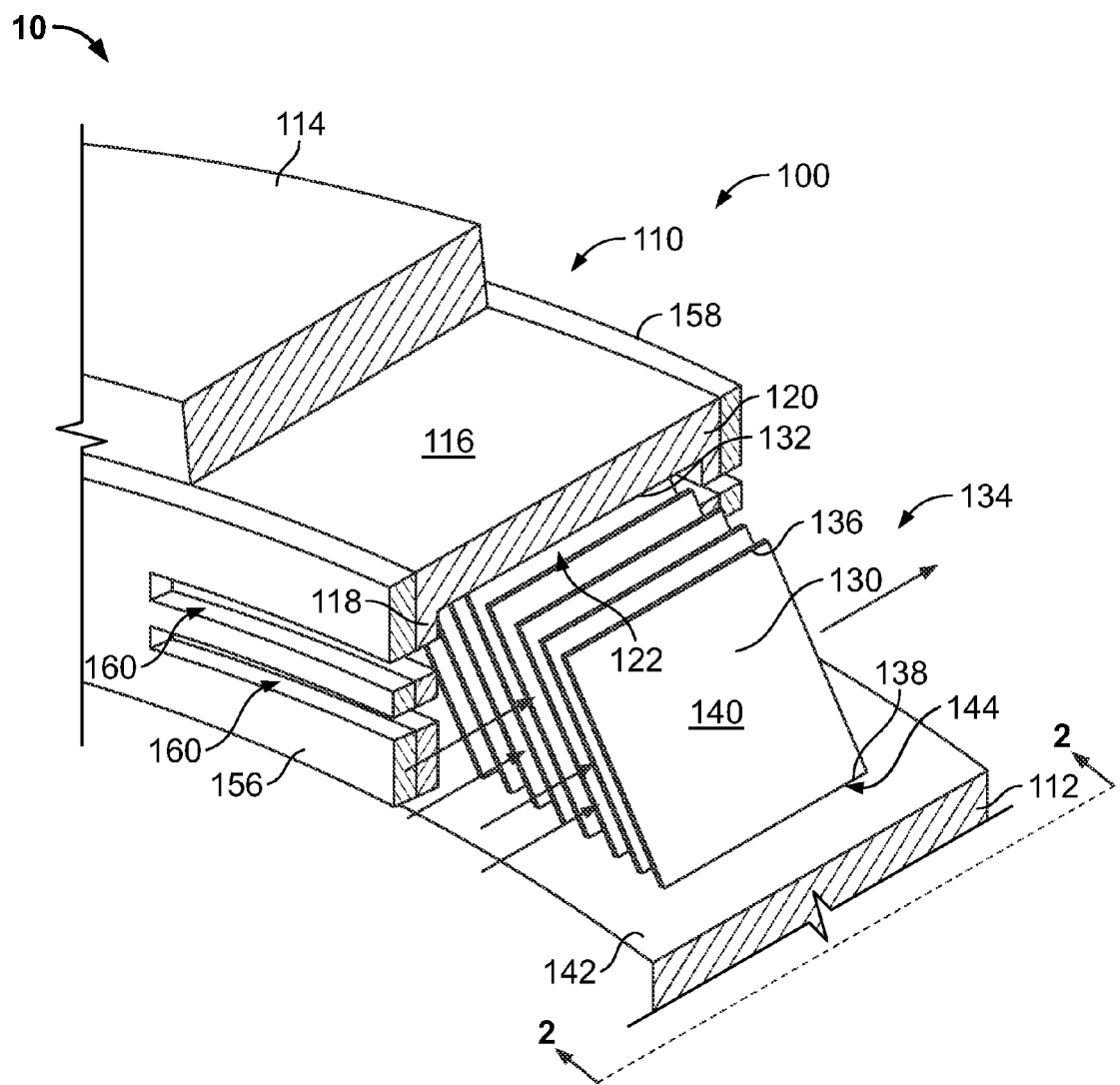
FIG. 1 is a perspective view of a portion of an exemplary rotary machine including a seal assembly.
Figure 2:
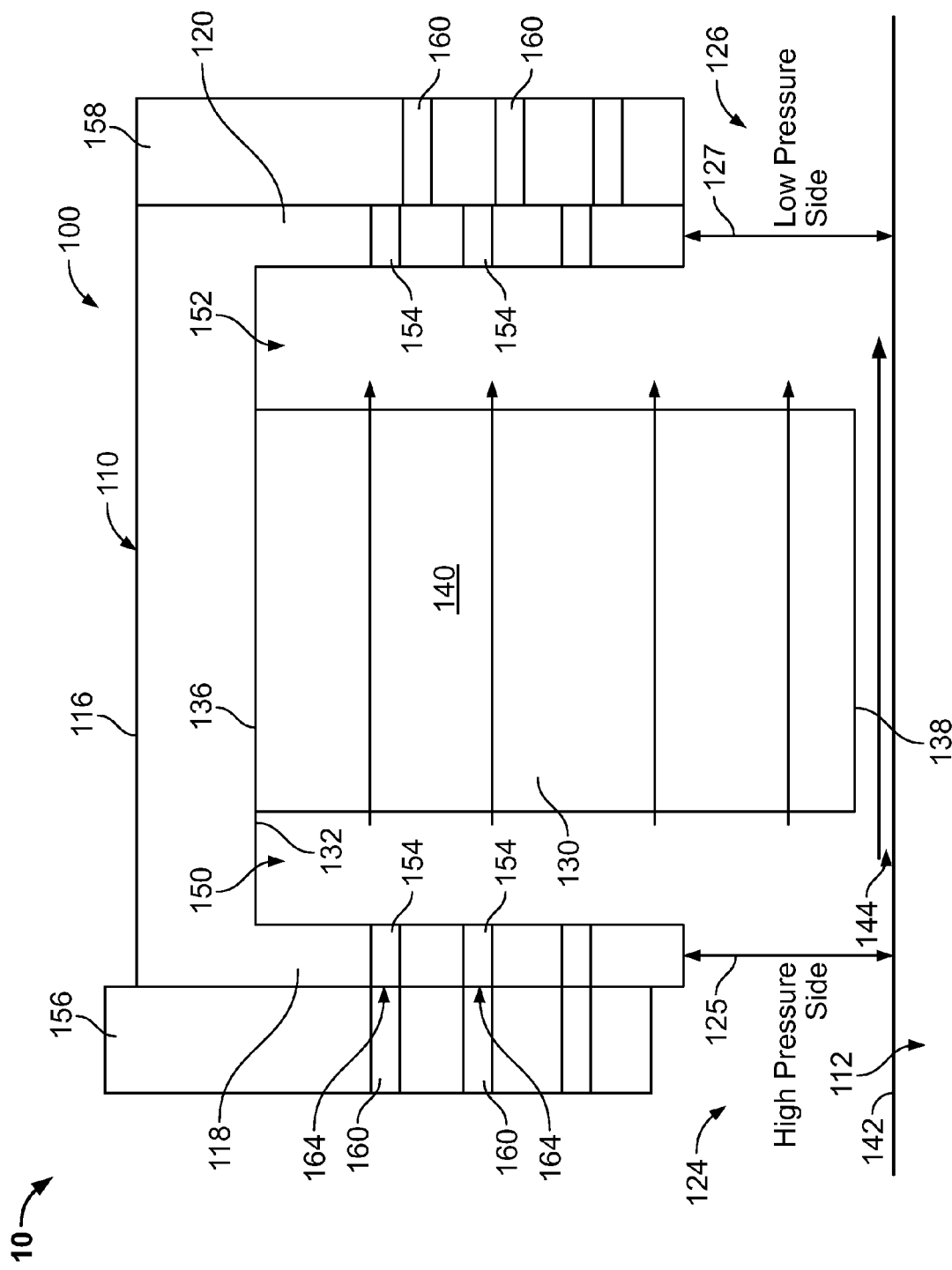
FIG. 2 is a cross-sectional view of the seal assembly shown in FIG. 1 and taken along line 2-2.

FIG. 1 is a perspective view of a portion of an exemplary rotary machine 10 including a seal assembly 100. FIG. 2 is a cross-sectional view of seal assembly 100 taken along line 2-2. In the exemplary embodiment, seal assembly 100 includes an annular housing 110 that is substantially U-shaped and that is positioned about a center axis (not shown), and more specifically, about a rotary component or rotor 112, of rotary machine 10. Moreover, annular housing 110 is coupled to a fixed stator 114 that is coupled within rotary machine 10 such that annular housing 110 extends between a high pressure side and a low pressure side of rotary machine 10. In the exemplary embodiment, rotary machine 10 is a steam turbine engine, however, it should be appreciated that rotary machine 10 may be any rotary machine such as, but not limited to, a gas turbine engine.

Annular housing 110, in the exemplary embodiment, includes a top wall 116, a front wall 118, and a rear wall 120. Front and rear walls 118 and 120 each extend generally radially from top wall 116 such that a cavity 122 is defined between front and rear walls 118 and 120. An inlet gap 124 is defined between front wall 118 and rotor 112. Inlet gap 124 extends a radial height 125. An outlet gap 126 is defined between rear wall 120 and rotor 112. Outlet gap 126 extends a radial height 127. In the exemplary embodiment, height 125 is approximately equal to height 127. Alternatively, height 125 may be different than height 127.

A plurality of compliant plates 130 are coupled to an inner surface 132 of top wall 116 such that each plate 130 extends generally radially through cavity 122 towards rotor 112. Moreover, in the exemplary embodiment, plates 130 are circumferentially-spaced and are oriented such that an annular seal 134 is defined between stator 114 and rotor 112. Each compliant plate 130 includes a base 136, a tip 138, and a body 140 extending therebetween. The base 136 of each compliant plate 130 is coupled to an inner surface 132 of top wall 116, and each tip 138 is positioned adjacent an outer surface 142 of rotor 112. In the exemplary embodiment, each compliant plate 130 extends obliquely from inner surface 132 towards rotor 112, and is oriented such that a clearance gap 144 is defined between each compliant plate tip 138 and rotor outer surface 142. In the exemplary embodiment, as described in more detail below, each clearance gap 144 varies during rotary machine 10 operation.

In the exemplary embodiment, a forward gap 150 is defined between compliant plates 130 and front wall 118, and an aft gap 152 is defined between compliant plates 130 and rear wall 120. In the exemplary embodiment, forward gap 150 is generally smaller than aft gap 152. Alternatively, forward gap 150 may be sized approximately equal to or larger than aft gap 152. In the exemplary embodiment, front and rear walls 118 and 120 each include two apertures 154 defined therein. In an alternative embodiment, front and rear walls 118 and/or 120 may include more or less than two apertures 154 defined therein. Moreover, in another embodiment, front wall 118 and/or rear wall 120 does not include any apertures 154 defined therein.

Annular housing 110, in the exemplary embodiment, also includes a first side plate 156 that is slidably coupled to an axially forward surface (not shown) of front wall 118, and a second side plate 158 is slidably coupled to an axially rearward surface (not shown) of rear wall 120. Alternatively, either first side plate 156 and/or second side plate 158 is rotatably coupled to the respective front and rear walls 118 and 120. Moreover, in the exemplary embodiment, first and second side plates 156 and 158 each include two apertures 160 defined therein. At least one of the apertures 160 is oriented and sized approximately the same as at least one of the apertures 154 defined in front and/or rear wall 118 and 120, respectively.

In the exemplary embodiment, first and second side plates 156 and 158, respectively, are each moveable between a first or open position, and a second or sealed position. Specifically, in the open position, either first and/or second side plate 156 and/or 158 facilitates aligning at least one of the side plate apertures 160 with at least one of the apertures 154 defined in the front and/or rear walls 118 and 120, such that a passageway 164 is defined by apertures 154 and 160. Passageway 164 extends through first side plate 156 and front wall 118, and more specifically, from the high pressure side of rotary machine 10 to forward gap 150. Passageway 164 enables fluid to flow from the high pressure side of rotary machine 10 into cavity 122. Alternatively, passageway 164 may extend through second side plate 158 and rear wall 120. In the sealed position, either first or second side plate 156 and 158 facilitates sealing at least one of the apertures 154 defined in the either front and/or rear wall 118 and 120, to facilitate preventing fluid from being channeled through the aperture 154. In the exemplary embodiment, and illustrated in FIG. 2, first side plate 156 is positioned in the open position, and second side plate 158 is positioned in the sealed position.

Figure 3:
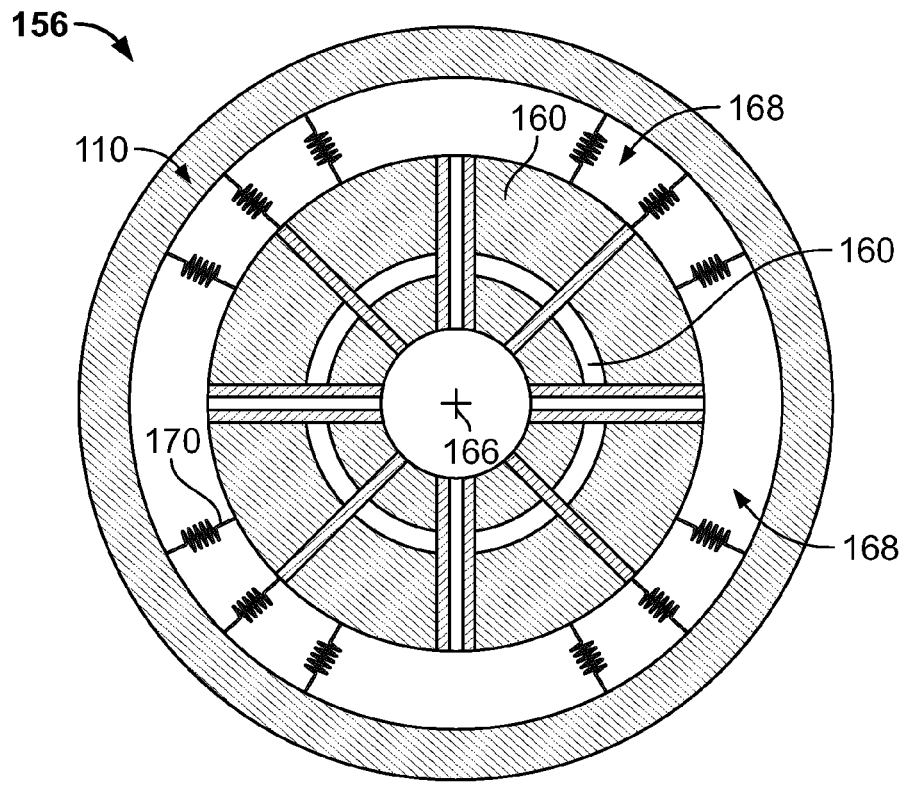
FIG. 3 is an axial view of an exemplary side plate used with the seal assembly shown in FIG. 1.

FIG. 3 is an axial view of side plate 156. It should be understood that in the exemplary embodiment, side plate 156 is substantially identical to side plate 158. As such, the following description also applies to side plate 158. In the exemplary embodiment, side plate 156 is substantially circular and is aligned substantially concentrically with respect to a center axis 166 that is substantially coaxial with respect to the axis of rotation of rotor 112 (shown in FIG. 2). Side plate 156, in the exemplary embodiment, also includes a plurality of sections 168 that are slidable radially outward from center axis 166. Each section 168 includes two apertures 160 defined therein that are sized and oriented approximately the same as apertures 154 (shown in FIG. 2). Alternatively, first side plate 156 may include any number of apertures 160 that enables seal assembly 100 (shown in FIG. 1) to function as described herein.

In the exemplary embodiment, during operation, an actuating means (not shown) moves each section 168 radially outward from center axis 166. More specifically, during operation, each section 168 is moved to either the open position or the closed position. The actuating means may be any means that enables side plate 156 to function as described herein, such as, but not limited to, biasing members and/or bellows.

During operation the flow of fluid is generally channeled from the high pressure area to the low pressure area. In a first configuration, first and second side plates 156 and 158 are each positioned in the sealed position. In such an orientation the flow of fluid is channeled through inlet gap 124 and into cavity 122. The flow of fluid is then channeled generally radially through forward gap 150 and generally axially through clearance gap 144. Moreover, at least a portion of fluid is channeled past compliant plates 130. Fluid contained within cavity 122 is discharged from seal assembly 100 through outlet gap 126. Such an orientation of plates 156 and 158 causes lifting forces to be exerted on compliant plates 130 such that tips 138 are forced away from rotor 112. Moreover, in such a configuration, the flow of fluid through seal assembly 100 is facilitated to be minimized because apertures 154 defined in front and rear walls 118 and 120 are substantially sealed by first and second side plates 156 and 158, respectively.

In a second configuration, first side plate 156 is positioned in the open position and second side plate 158 is positioned in the sealed position. In such an orientation, fluid is channeled through inlet gap 124 and passageway 164, through apertures 160 and 154 defined in plate 156 and front wall 118, respectively, into cavity 122. The flow of fluid is further channeled generally radially through forward gap 150 and generally axially through clearance gap 144. Moreover, at least a portion of the fluid flow is channeled past compliant plates 130. Fluid contained within cavity 122 is discharged from seal assembly 100 through outlet gap 126. Such a configuration causes blow down forces to be exerted on compliant plates 130 such that tips 138 are forced closer to rotor 112. Moreover, in the second configuration, the flow of fluid through seal assembly 100 is facilitated to be increased in comparison to the first configuration because first side plate 156 is positioned in the open position, such that additional fluid is channeled into cavity 122.

In a third configuration, first and second side plates 156 and 158 are each positioned in the open position. In such an orientation, fluid is channeled through inlet gap 124 and passageway 164, through apertures 160 and 154 and front wall 118, respectively, into cavity 122. The flow of fluid is also channeled generally radially through forward gap 150 and generally axially through clearance gap 144. Moreover, at least a portion of fluid is channeled past compliant plates 130. Fluid contained within cavity 122 is discharged from seal assembly 100 through outlet gap 126 and passageway 164, through apertures 160 and 154. Such an orientation causes lifting forces to be exerted on compliant plates 130 such that tips 138 are forced away from rotor 112. Moreover, in such a configuration, the flow of fluid through seal assembly 100 is facilitated to be increased in comparison to the previously described configurations because first and second side plates 156 and 158 are positioned in the open position, such that additional fluid is channeled through seal assembly 100 than is channeled through seal assembly 100 in the first and second configurations.

In a fourth configuration, first side plate 156 is positioned in the sealed position and second side plate 158 is positioned in the open position. In such an orientation, the flow of fluid is channeled through inlet gap 124 into cavity 122. The flow of fluid is further channeled generally radially through forward gap 150 and generally axially through clearance gap 144. Moreover, at least a portion of fluid flow is channeled past compliant plates 130. Fluid contained within cavity 122 is discharged from seal assembly 100 through outlet gap 126 and passageway 164 through apertures 160 and 154. Such a configuration causes lifting forces to be exerted on compliant plates 130, wherein such lifting forces are greater than the lifting forces generated in the first configuration. Moreover, in the fourth configuration, the flow of fluid through seal assembly 100 is substantially equivalent to the flow of fluid through seal assembly 100 in the first configuration because front wall apertures 154 are sealed.

In the exemplary embodiment, the first, third, and fourth configurations each cause exerting lifting forces to be exerted on compliant plates 130 such that tips 138 are lifted away from rotor 112. Such configurations enable non-contact operation of rotary machine 10 during low pressure gradient conditions, such as, but not limited to, shut down operations and start-up operations. The second configuration causes blow-down forces to be exerted on compliant plates 130 such that tips 138 are forced closer to rotor 112. The second configuration enables clearance gap 144 to be minimized during high pressure gradient conditions, such as during electric power generation conditions, such that the flow of fluid through seal assembly 100 is facilitated to be reduced.

Figure 4:
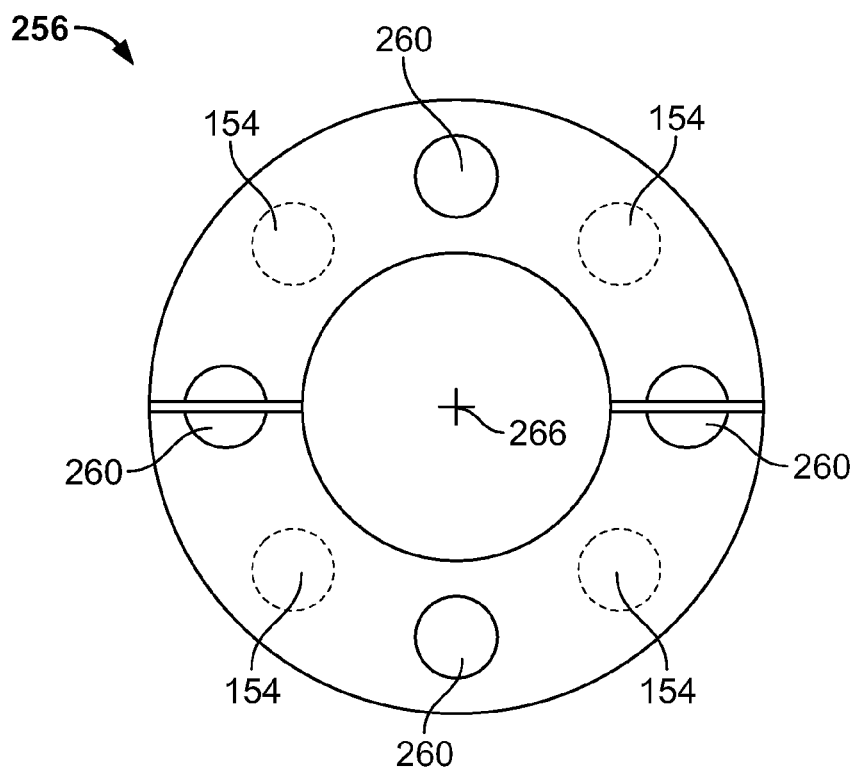
FIG. 4 is an axial view of an alternative embodiment of a side plate that may be used with the seal assembly shown in FIG. 1.

FIG. 4 is an axial view of an alternative side plate 256 that may be used with assembly 100 (shown in FIG. 1). In the exemplary embodiment, side plate 256 is substantially circular and is aligned substantially concentrically with respect to a center axis 266 that is substantially coaxial with respect to the axis of rotation of rotor 112 (shown in FIG. 2). Side plate 256, in the exemplary embodiment, includes four apertures 260 defined therein. Alternatively, side plate 256 may include any number of apertures 260 that enables seal assembly 100 to function as described herein. Each aperture 260 is sized and oriented approximately the same as to each aperture 154.

In the exemplary embodiment, during operation, a rotating means (not shown) rotates side plate 256 circumferentially about center axis 266 to open position or the sealed position. In the exemplary embodiment, the rotating means may be any means that enables first side plate 256 to function as described herein.

Figure 5:
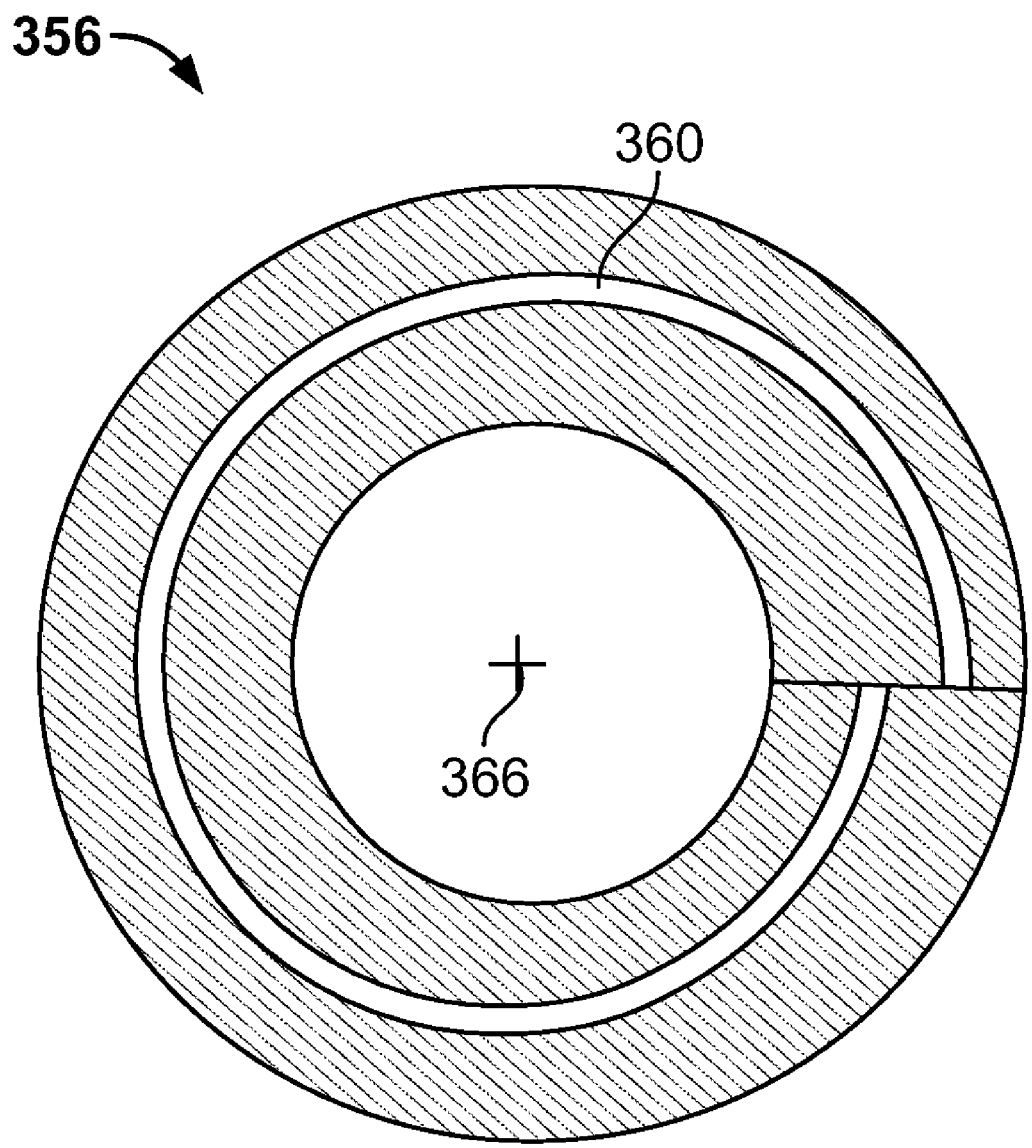
FIG. 5 is an axial view of another alternative embodiment of a side plate that may be used with the seal assembly shown in FIG. 1.

FIG. 5 is an axial view of another alternative side plate 356 that may be used with assembly 100 (shown in FIG. 1). In the exemplary embodiment, side plate 356 is substantially circular and circumscribes a center axis 366 that is coaxial with and is aligned substantially concentrically with respect to the axis of rotation of rotor 112 (shown in FIG. 1). Side plate 356, in the exemplary embodiment, includes an aperture 160 defined therein that extends generally helically about center axis 366. Alternatively, side plate 356 may include any number of apertures 360 that enables seal assembly 100 to function as described herein. Each aperture 360 is sized and oriented approximately the same as apertures 154 (shown in FIG. 2).

During operation, in the exemplary embodiment, a rotating means (not shown) rotates first side plate 356 circumferentially about center axis 366 to either the open position or the sealed position. In the exemplary embodiment, the rotating means may be any means that enables first side plate 356 to function as described herein.

In the exemplary embodiment, side plates 156 and 158 facilitate controlling the forces exerted on compliant plates 130 and the amount of flow channeled past compliant plates 130. More specifically, first and second plates 156 and 158 facilitate controlling an amount of flow channeled through either front and/or rear wall 118 and 120.

The above-described methods and apparatus facilitate sealing between a high pressure area and a low pressure area defined within a rotary machine by controlling the forces exerted on a plurality of compliant plates coupled within a seal assembly. Specifically, each seal assembly includes a side plate that is slidably coupled to either the front wall and/or the rear wall of an annular seal housing. Each side plate includes at least one aperture defined therein that is oriented and sized approximately the same as an aperture defined in either the front and/or rear wall. Moreover, each side plate is moveable, with respect to the respective front and rear walls, between an open position and a sealed position. The open position enables the apertures defined in the front and/or rear walls to be opened, and the sealed position enables the apertures defined in the front and/or rear walls to be sealed. As a result, a plurality of different configurations are possible which enable the amount of the fluid flow channeled through the seal assembly 100 to be controlled. Moreover, such control facilitates preventing compliant plate tip contact with the rotor during pre-determined operating conditions of low pressure gradients. As a result, rotor performance and useful life of such seal assemblies are facilitated to be improved.

Exemplary embodiments of seal assemblies are described in detail above. The seal assembly described herein is not limited to use with the rotary machines described herein, but rather, the seal assembly can be utilized independently and separately the rotary machine and/or rotor components described herein. Moreover, the invention is not limited to the embodiments of the seal assemblies described above in detail. Rather, other variations of the seal assembly mixers may be utilized within the spirit and scope of the claims.

While the invention has been described in terms of various specific embodiments, those skilled in the art will recognize that the invention can be practiced with modification within the spirit and scope of the claims.

What is claimed is:

1. A method for assembling a rotary machine, said method comprising:
    providing at least one seal assembly that includes at least one annular seal housing defined by a top wall, a front wall, and a rear wall, that are connected together such that a cavity is defined within the housing;
    coupling a plurality of flexible plates within the cavity such that the plates are axially-spaced from the front wall and the rear wall within the cavity;
    coupling at least one side plate to the at least one annular seal housing such that the at least one side plate is adjacent to at least one of a front side of the front wall and a rear side of the rear wall, and is moveable in at least one direction that is substantially perpendicular to an axis of rotation of the rotary machine with respect to said at least one of the front wall and the rear wall; and
    coupling the at least one sealing assembly within a rotary machine to facilitate sealing between a rotary component and a stator component.

2. A method in accordance with claim 1 wherein coupling at least one side plate to the at least one annular seal housing further comprises coupling at least one side plate that includes at least one aperture defined therein to the housing such that the at least one aperture is aligned substantially concurrently with at least one aperture defined in at least one of the front wall and the rear wall.

3. A method in accordance with claim 1 wherein coupling at least one side plate to the at least one annular seal housing further comprises coupling at least one side plate to the seal housing such that the plate is moveable in a generally radial direction with respect to the axis of rotation of the rotary machine.

4. A method in accordance with claim 1 wherein coupling at least one side plate to the at least one annular seal housing further comprises coupling at least one side plate to the housing such that the side plate is moveable between an open position and a sealed position.

5. A method in accordance with claim 1 wherein coupling at least one side plate to the at least one annular seal housing further comprises coupling at least one side plate to the housing such that the side plate is moveable to control a flow of fluid into the housing cavity.

6. A method in accordance with claim 1 wherein coupling at least one side plate to the at least one annular seal housing further comprises coupling at least one side plate to the housing to facilitate controlling a differential pressure force exerted on each compliant plate.

7. A method in accordance with claim 1 wherein coupling at least one side plate to the at least one annular housing further comprises coupling at least one side plate to the housing to facilitate regulating an amount of fluid flow channeled past the plurality of compliant plates.

8. A method for assembling a rotary machine, said method comprising:
    providing at least one seal assembly that includes at least one annular seal housing defined by a top wall, a front wall, and a rear wall, that are connected together such that a cavity is defined within the housing;
    coupling a plurality of flexible plates within the cavity such that the plates are axially-spaced from the front wall and the rear wall within the cavity;
    coupling at least one side plate to the at least one annular seal housing such that the at least one side plate is moveable with respect to at least one of the front wall and the rear wall; and
    coupling the at least one sealing assembly within a rotary machine to facilitate sealing between a rotary component and a stator component,
        wherein coupling at least one side plate to the at least one annular seal housing further comprises coupling at least one side plate to the housing such that the side plate is rotatable in a generally circumferential direction with respect to an axis of rotation of the rotary machine.

9. A seal assembly for a rotary machine, said seal assembly comprising:
    an annular seal housing comprising:
        a top wall;
        a front wall coupled to said top wall; and
        a rear wall coupled to said top wall such that said rear wall is spaced from said front wall such that a cavity is defined within said housing;
    a plurality of circumferentially-spaced flexible compliant plates coupled within said cavity; and
    at least one side plate slidably coupled to at least one of a front side of said front wall and a rear side of said rear wall to facilitate controlling a flow of fluid through at least one of said front wall and said rear wall,
    wherein the at least one side plate is slidable in a direction that is substantially perpendicular to an axis of rotation of the rotary machine.

10. A seal assembly in accordance with claim 9 wherein said at least one side plate comprises at least one aperture defined therein that is sized approximately the same as at least one aperture defined in at least one of said front wall and said rear wall.

11. A seal assembly in accordance with claim 9 wherein said at least one side plate is moveable with respect to said front wall and said rear wall, to facilitate controlling flow of fluid into said housing cavity.

12. A seal assembly in accordance with claim 9 wherein said at least one side plate is moveable with respect to said front wall and said rear wall, to a second position to facilitate preventing fluid from flowing into said housing cavity.

13. A sealing assembly in accordance with claim 9 wherein said at least one side plate is moveable in a generally radial direction with respect to said central axis of said annular housing.

14. A seal assembly for a rotary machine, said seal assembly comprising:
    an annular seal housing comprising:
        a top wall;
        a front wall coupled to said top wall; and
        a rear wall coupled to said top wall such that said rear wall is spaced from said front wall such that a cavity is defined within said housing;
    a plurality of circumferentially-spaced flexible compliant plates coupled within said cavity; and at least one side plate slidably coupled to at least one of said front wall and said rear wall to facilitate controlling a flow of fluid through at least one of said front wall and said rear wall, wherein said at least one side plate is rotatable in a generally circumferential direction with respect to said central axis of said annular housing.

15. A rotary machine comprising:

a rotary component including an axis of rotation;

a stationary component coupled adjacent to said rotary component; and a seal assembly coupled between said stationary component and said rotary component, said seal assembly comprising:

an annular seal housing comprising:

a top wall;

a front wall coupled to said top wall; and a rear wall coupled to said top wall, such that a cavity is defined within said housing;

a plurality of circumferentially-spaced compliant plates coupled within said cavity; and at least one side plate slidably coupled to at least one of a front side of said front wall and a rear side of said rear wall to facilitate controlling a flow of fluid within said cavity, wherein the at least one side plate is slidable in a direction that is substantially perpendicular to the axis of rotation.

16. A rotary machine in accordance with claim 15 wherein at least a portion of said side plate is moveable in a generally radial direction with respect to said axis of rotation.

17. A rotary machine in accordance with claim 15 wherein said at least one side plate comprises at least one aperture defined therein that is sized approximately equal to at least one aperture defined in at least one of said front wall and said rear wall.

18. A rotary machine in accordance with claim 15 wherein said at least one side plate is moveable with respect to said front wall and said rear wall, to facilitate controlling a flow of fluid channeled into said cavity.

19. A rotary machine in accordance with claim 15 wherein said at least one side plate is moveable with respect to said front wall and said rear wall, to facilitate preventing fluid from being discharged from said cavity.

20. A rotary machine comprising:

a rotary component including an axis of rotation;

a stationary component coupled adjacent to said rotary component; and a seal assembly coupled between said stationary component and said rotary component, said seal assembly comprising:

an annular seal housing comprising:

a top wall;

a front wall coupled to said top wall; and a rear wall coupled to said top wall, such that a cavity is defined within said housing;

a plurality of circumferentially-spaced compliant plates coupled within said cavity; and at least one side plate slidably coupled to at least one of said front wall and said rear wall to facilitate controlling a flow of fluid within said cavity, wherein said side plate is rotatable in a generally circumferential direction with respect to said axis of rotation.

\* \* \* \* \*